(12) United States Patent
Miller

(10) Patent No.: US 11,358,459 B1
(45) Date of Patent: Jun. 14, 2022

(54) COVER ASSEMBLY FOR VEHICLE

(71) Applicant: Amber Miller, Monett, MO (US)

(72) Inventor: Amber Miller, Monett, MO (US)

( * ) Notice: Subject to any disclaimer, the term of this patent is extended or adjusted under 35 U.S.C. 154(b) by 0 days.

(21) Appl. No.: 16/988,164

(22) Filed: Aug. 7, 2020

Related U.S. Application Data

(60) Provisional application No. 62/940,459, filed on Nov. 26, 2019.

(51) Int. Cl.
B60J 11/08 (2006.01)
B60J 1/20 (2006.01)
B60R 13/02 (2006.01)

(52) U.S. Cl.
CPC ............. B60J 11/08 (2013.01); B60J 1/2047 (2013.01); B60J 1/2086 (2013.01); B60R 13/0256 (2013.01)

(58) Field of Classification Search
CPC ........ B60J 11/08; B60J 1/2011; B60J 1/2091; B60J 1/2094
USPC .............................. 296/83, 81, 95.1, 96, 97.7
See application file for complete search history.

(56) References Cited

U.S. PATENT DOCUMENTS

| | | | | |
|---|---|---|---|---|
| 1,110,857 A * | 9/1914 | Applar | ..................... | B60J 1/085 296/141 |
| 2,620,224 A * | 12/1952 | Hedley | .................. | B60J 5/0487 296/148 |
| 4,013,315 A | 3/1977 | West | | |
| 4,733,902 A * | 3/1988 | Rabb | ....................... | B60J 7/104 296/214 |
| 4,784,426 A * | 11/1988 | Mannisto-Iches | ..... | B60J 1/2011 160/370.21 |
| 4,930,835 A * | 6/1990 | Bruce | ...................... | B60J 10/90 160/368.1 |
| 5,035,460 A * | 7/1991 | Huang | ..................... | B60J 11/08 296/95.1 |
| 5,156,433 A * | 10/1992 | Decker | ................... | B60J 1/2011 160/370.21 |
| 5,562,142 A * | 10/1996 | Ziel | ........................ | B60J 1/2013 160/180 |
| 5,915,399 A * | 6/1999 | Yang | ........................ | B60J 11/00 135/88.01 |
| 6,209,614 B1 * | 4/2001 | Smoot | .................... | A47H 21/00 160/237 |
| 6,394,528 B2 | 5/2002 | Hoenack | | |

(Continued)

Primary Examiner — D Glenn Dayoan
Assistant Examiner — Kevin P Weldon
(74) Attorney, Agent, or Firm — John Rizvi; John Rizvi, P.A.—The Patent Professor

(57) ABSTRACT

A cover assembly for use in a vehicle to protect electronic components on a vehicle's dashboard, shield the interior of the vehicle from rain and debris, and provide privacy to occupants in the vehicle when in the vehicle. The cover assembly includes a dash cover, rain curtains, and privacy curtains that include long and/or short bungee cords for attaching and securing the cover and curtains to roll bars in a vehicle. The cover and some of the privacy curtains also include suction cups that are attachable to a vehicles windshield or back window. The cover assembly is quickly installed within a vehicle with ease to cover door and/or window openings, or the windshield or back window of a vehicle. The cover assembly may come in a variety of different sizes to accommodate use with different makes and models of vehicles having roll bars, and removable doors, rooftops, and/or windows.

19 Claims, 10 Drawing Sheets

(56) References Cited

U.S. PATENT DOCUMENTS

| | | | |
|---|---|---|---|
| 6,648,396 B2* | 11/2003 | Monahan | B60J 1/2011 |
| | | | 160/370.21 |
| 6,926,334 B1 | 8/2005 | Diehm | |
| 7,278,677 B2 | 10/2007 | Emerson | |
| 8,668,242 B2* | 3/2014 | Sobik | B62D 33/0621 |
| | | | 296/135 |
| 2004/0061356 A1* | 4/2004 | Martini | B60J 5/0487 |
| | | | 296/153 |
| 2006/0022483 A1* | 2/2006 | Emerson | B60J 11/06 |
| | | | 296/136.04 |
| 2007/0018485 A1* | 1/2007 | Jacobson | B60J 7/10 |
| | | | 296/210 |
| 2008/0164713 A1 | 7/2008 | Saurman et al. | |
| 2010/0045062 A1* | 2/2010 | Boer | B60J 1/2011 |
| | | | 296/97.7 |
| 2010/0122782 A1* | 5/2010 | Fox | B60J 1/2011 |
| | | | 160/370.21 |
| 2015/0013861 A1* | 1/2015 | Ein | B60J 11/08 |
| | | | 150/168 |
| 2017/0284117 A1* | 10/2017 | Volin | E04H 15/48 |

* cited by examiner

COVER ASSEMBLY FOR VEHICLE

CROSS-REFERENCE TO RELATED APPLICATIONS

This application claims the benefit of U.S. Provisional Patent Application Ser. No. 62/940,459, filed on Nov. 26, 2019, which is incorporated herein in its entirety.

FIELD OF THE INVENTION

The present invention relates to vehicle accessories, and more particularly, to a cover assembly for use in a vehicle that includes a dash cover for protecting electronic equipment on a vehicle dashboard, rain curtains for protecting the interior of a vehicle from rain or debris, and privacy curtains for providing privacy to occupants of a vehicle.

BACKGROUND OF THE INVENTION

Some vehicles are engineered to permit users or owners to remove doors, windows, and/or rooftops from the body of the vehicle to expose occupants to the open air to provide a sense of freedom and being one with nature when riding over open terrain, trails and roads. Vehicles with modular removable doors and windows are often designed for use in certain recreational activities that take place in wooded areas, on mountains, along river beads or streams, or in muddy terrain. One particular make and model of a vehicle that accommodates removing certain vehicle components such as doors and windows includes the well-known Jeep Wrangler. There are various models of Jeep Wranglers available for consumers including for example, a 2-door, and a 4-door version. The Jeep Wrangler is generally designed to give users the option of removing various sections of the vehicle's body to expose occupants to the open road. The Jeep Wrangler generally includes a soft canopy that allows users to remove the rooftop, windows, and/or doors from the vehicle. Such windows are often constructed from a vinyl or plastic material. It is common practice for owners to remove the doors and/or windows when going hunting, fishing, camping, or simply joy riding on muddy roads, in dessert dooms, or on wilderness trials.

Occupants riding in vehicles with the doors and/or windows removed often enjoy feeling the impact of the wind and sun on their body, as contact with the open air makes occupant riders feel free and less confined. There are of course certain inconveniences associated with riding in vehicles with removed doors and/or windows as there is less covering to protect both the occupants and the interior of the vehicle. For example, while riding over open terrain, it is common for dirt, dust, debris, and water to enter the interior of the vehicle and come in contact with various parts including the dashboard, seats, and occupants themselves. Mud and dirt can invade the interior of the vehicle and cause possible damage to the electronics provided on the dashboard such as the radio, gauges, electronic display screen, and other functional components including knobs or pushbuttons. To prevent dirt and debris from entering the vehicle, users often resort to reinstalling the removed doors, windows, and/or rooftop to shield out the dirt and debris thus undermining the intended purpose of employing removable modular doors and windows.

Efforts to remove and reinstall vehicle accessories including doors, windows, and/or a rooftop on a Jeep Wrangler or other vehicle, can be time consuming, cumbersome and sometimes frustrating at times. For instance, the removable doors or windows often include a plurality of snaps that must be individually attached together to reinstall the members on the vehicle. This task becomes more challenging when physical characteristics of the material has changes over time as result of varying temperatures due to heat and cold initiated by the sun and rain. As a result of changes in temperature, the material often shrinks in size forcing users to pull and stretch the material in order to properly attach the snaps together often tearing the material. Thus, removing and reinstalling windows or doors on a vehicle can sometimes be a laboring chore that requires time.

There are also circumstances when occupants may wish to quickly shield the interior of the vehicle without having to spend the extended time needed to reattach the doors, windows, or rooftop of a vehicle. For instance, users may wish to shield the interior of the vehicle during periods of short rainfalls, or for other occasions while riding in the vehicle. It is cumbersome for occupants to stop the vehicle reinstall the doors, and/or windows, and then stop shortly thereafter to remove the doors and/or windows again. As such, there remains a desire to not only protect the electronics located on a vehicle dashboard, but also to provide covers that can be easily, and quickly installed on the vehicle to protect the interior of the vehicle when needed in certain situations such as when raining, without the burden of having to spend a great deal of time to reinstall the modular doors or windows.

A common practice often encountered by nature goers is the ability to sleep in the vehicle when camping or engaging in other outdoor, wilderness adventures. It is common place for vehicles, like the Jeep Wrangler, to be used by individuals when camping, or going on hunting trips or nature rides as the vehicle is capable of negotiating over hills, gulley's and streams, over small fallen trees, and stroll along wide open fields. In such circumstances, occupants sometimes desire to rest and sleep in the vehicle overnight. To feel more secure, occupants often cover the windshield and open spaces of the windows with towels, blankets, or clothing to provide privacy and prevent possible wondering onlookers from viewing the interior of the vehicle. The windows are also shielded to prevent the early morning sun from glaring in the vehicle. Unfortunately, it is often the case where the placed towels, or blankets fail to remain in place and consistently slide off, or fall from the windows frustrating the intended purpose of attaining privacy. Although many conventional devices have been developed for use with vehicles to help shield the interior of the vehicle, such devices are either cumbersome to install, are not very practical or user-friendly, or are used to cover a small area of the vehicle thus providing limited applicability. Many conventional covers are designed to completely cover the outside of the vehicle, include fastening systems that are not compatible for use with vehicles having roll bars, have limited application, and are not designed for use with vehicles having a particular make, and model.

Accordingly, there is an established need for a solution to at least one of the aforementioned problems. There remains a need for a cover assembly including a dash cover, rain curtains, and privacy curtains to protect electronics on a vehicle's dashboard, shield the interior of the vehicle from rain, and debris, and provide privacy for occupants of a vehicle when sleeping or resting in the vehicle. The cover assembly includes fasteners that are user-friendly and compatible for use with vehicles having roll bars, and can be quickly installed and removed with ease.

SUMMARY OF THE INVENTION

The present invention is directed to a cover assembly for with vehicles such as a Jeep Wrangler, where the cover assembly includes a dash cover for protecting the electronic components located on a vehicle's dashboard, rain curtains for protecting the interior of the vehicle from rain and debris, and privacy curtains for providing privacy to occupants of the vehicle from onlookers when sleeping in the vehicle. The dash cover and curtains each include a pliable panel, a plurality of grommets provided at designated areas along the perimeter or peripheral edge of the pliable panel, and multiple fasteners including long and/or short ball bungee cords, and suction cups for securing the cover assembly within a vehicle to cover electronics on a vehicle dashboard, one or more door and/or window openings, and the vehicle's windshield and/or back window.

A first embodiment provides a cover assembly removably attachable within a vehicle, where the cover assembly comprises: a dash cover including a first pliable panel having a first and a second attachment each including a hook, and a pair of suction cups, where the dash cover is attachable to the vehicle for covering electronics provided in the vehicle such that the pair of suction cups are removably attached to an inner surface of a windshield associated with the vehicle and each of the hooks are coupled to front seats, at least one privacy curtain including a second pliable panel having a third and a fourth attachment where the at least one privacy curtain is attachable to the vehicle for covering at least one opening associated with either a window or door, or a window and door, of the vehicle such that the third and fourth attachment are secured to roll bars extending above the at least one opening, at least one rain curtain including a third pliable panel having a fifth and a sixth attachment, and another pair of suction cups, where the at least one rain curtain is attachable to the vehicle for covering the at least one opening such that the fifth and sixth attachment are secured to the roll bars, and at least one suction cup of the another pair of suction cups is releasably affixed to an outer surface of the windshield, and wherein either the at least one privacy curtain and the at least one rain curtain, or the dash cover and any of the curtains are attached to the vehicle to provide a protective assembly for covering either the at least one opening, or the at least one opening and the electronics.

In one aspect, the attachment includes one or more long or short ball bungee cords, and the hook includes an S hook.

In one aspect, the at least one privacy curtain includes a first privacy curtain including a pliable panel having a dimensional size of 20 inches in height, and 22 inches in length, a second privacy curtain including a pliable panel having a dimensional size of 20 inches in height, and 27 inches in length, and a third privacy curtain including a pliable panel having a dimensional size of 20¾ inches in height, a top region being 46½ inches in length integral with a bottom region being 49 inches in length.

In another aspect, each pliable panel of the first and second privacy curtain include long and/or short ball bungee cords disposed at upper corner regions of each pliable panel.

In one aspect, the at least one rain curtain includes a first rain curtain for use with a vehicle having two doors where each door is removable, or includes a window that is removable, and a second rain curtain for use with a vehicle having four doors where each door is removable or includes an associated window that is removable.

In another aspect, the first rain curtain includes a pliable panel that comprises 42 inches in height, and 48 inches in length, and includes one or more long and/or short bungee cords, and at least one suction cup.

In one aspect, the second rain curtain includes a pliable panel that comprises 48 inches in height, and 75 inches in length, and includes one or more long and/or short bungee cords, and at least one suction cup.

In one aspect, each pliable panel includes a front, a back, a seam that surrounds the outer peripheral edge of the pliable panel, and at least two grommets.

In one aspect, the seam comprises a 1-inch seam.

In one aspect, the at least one privacy curtain includes a full front privacy curtain having a first pliable panel including one or more long and/or short ball bungee cords, a second pliable panel including a pair of suction cups, and a third pliable panel including one or more long and/or short ball bungee cords, where the first pliable panel, second pliable panel, and third pliable panel are attached together along longitudinal seams forming one integral front privacy curtain.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a cover assembly including a dash cover for protecting the electronic components on a vehicle's dashboard, rain curtains for protecting the interior of the vehicle from rain and debris, and privacy curtains for providing privacy to occupants of the vehicle from possible onlookers. The cover assembly is attached to the vehicle to cover one or more door and/or window openings of the vehicle, and optionally a windshield or back window of a vehicle. The cover assembly includes long or short cords, and suction cups for attaching and securing the cover assembly to roll bars, and to other parts or surfaces of the vehicle when installed in the vehicle.

It is understood that the term, "vehicle" as referred to herein, may include any vehicle having a specific make, model, and year, including for example, a Jeep Wrangler built in the years 2000-2020, or any other vehicle where users or occupants may wish to protect or shield the interior of the vehicle from rain, or provide privacy from on-lookers. For illustration purposes only, reference to "a vehicle" includes a vehicle having one or more roll bars, sound bars, and one or more removable doors, windows, and rooftop associated with the vehicle.

Figure 1:
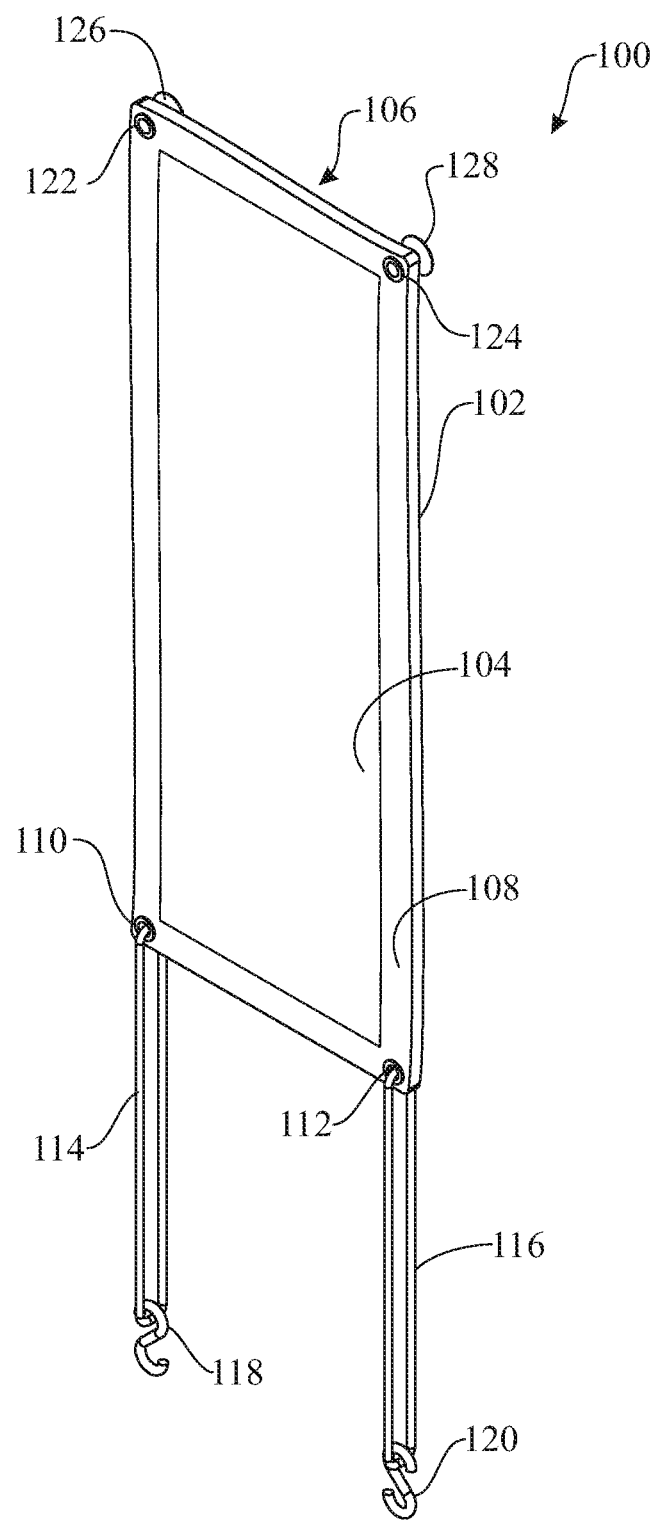
FIG. 1 presents a front, perspective view of a cover assembly including a dash cover for protecting electronics in a vehicle, showing a pliable panel including grommets and multiple fasteners for securing the dash cover in position over the electronics, in accordance with an embodiment of the present invention.

Referring now to FIG. 1 there is shown a front, perspective view of a cover assembly including a dash cover 100 for protecting electronic elements or components on a dashboard of a vehicle, in accordance with an embodiment of the present invention. The dash cover 100 includes a generally square or rectangular pliable panel 102 having a front 104, a back 106, and one integral, or multiple seams 108 that extends around the peripheral edge of the pliable panel 102 to enhance the structural integrity, and layout of the pliable panel 102 during use. In one non-limiting embodiment, seam 108 comprises a 1-inch seam though other seam sizes may be employed. The dimensional configuration of the pliable panel 102 is selected to adequately cover electronic components provided on a vehicle's front dashboard. Such electronic equipment may include for example, a radio, operator interface, control buttons, or electronic display typically provided on the front region of a vehicle. In one non-limiting embodiment, the size of pliable panel 102 is 25⅝ inches in height, and 9¾ inches in width though other sizes may be contemplated for use. The pliable panel 102 is constructed from a plastic material, or a durable water resistant rip proof fabric tailored to resist or repel water.

The dash cover 100 includes one or more grommets 110, 112 provided at corner regions of the pliable panel 102 to accommodate long or short cords 114, 116 that are used for attaching and securing a portion of the pliable panel 102 to one or more roll bars provided in a vehicle. For instance, particular vehicles, such as a Jeep Wrangler, generally includes roll bars that extend along the lateral and longitudinal axis of the upper interior region of the vehicle. The roll bars typically extend above the door and/or window openings of the vehicle. The vehicle often includes a sound bar that extends laterally across the vehicle to accommodate attaching audible speakers. Such grommets 110, 112 generally comprise circular rings that are secured within openings preformed in the body of the pliable panel 102. Without grommets 110, 112, the preformed openings formed in the pliable panel 102 would likely tear over time. As such, the grommets 110, 112 prevent the pliable panel 102 from tearing when pulling and attaching cords 114, 116 to roll bars or other parts of the vehicle. The grommets 110, 112 are may include plastic, nylon, or metal such as aluminum, brass, or stainless steel that is resistant to rust.

The long or short cords 114, 116 may include nylon, rubber, or cotton cords that each comprise a fixed length, an adjustable length, or alternatively, include long or short ball bungee cords capable of resiliently stretching. In one non-limiting example, each cord 114, 116 may comprise a fixed length of 12 inches, or a non-stretched length of 12 inches. As shown in FIG. 1, a pair of S-hooks, denoted at 118, 120, are disposed at the distal ends of each respective cord 114, 116 for securing the pliable panel 102 in place over electronics on a vehicle's dashboard. It is appreciated that the S-hooks 118, 120 may be replaced with other suitable fasteners such as clips, clamps, or closed eyehooks. In one example, the S-hooks 118, 120 may be replaced with carabineers.

Figure 2:
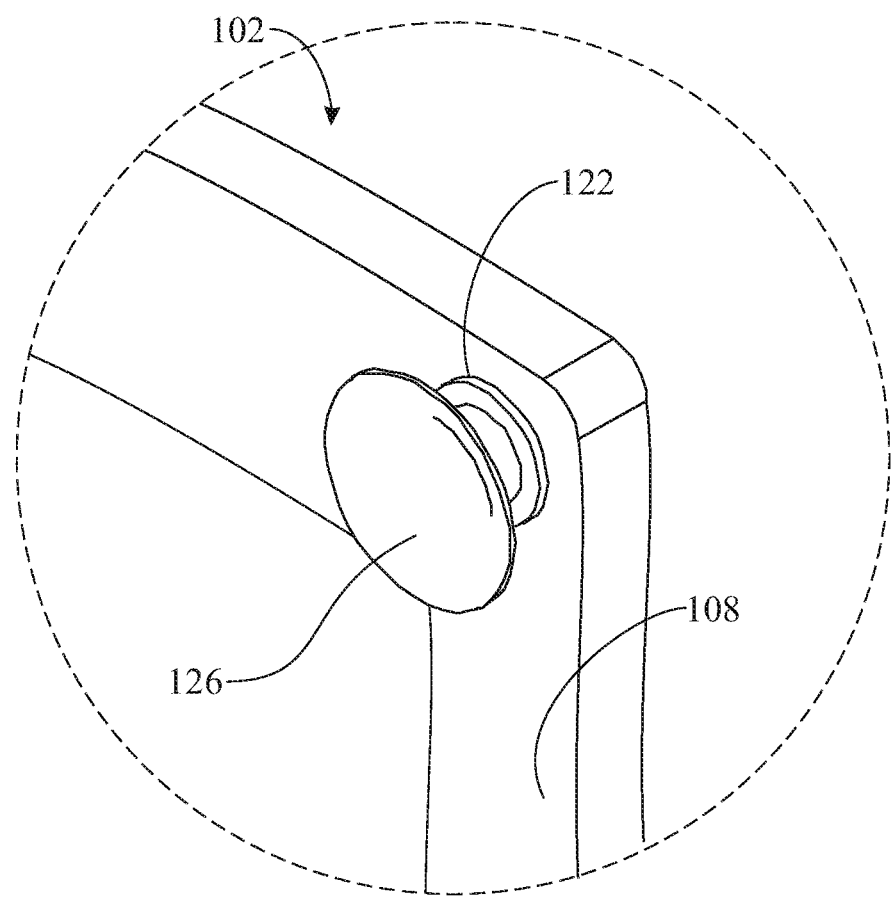
FIG. 2 presents an exploded, partial, rear, perspective view of the dash cover of FIG. 1, showing one of the multiple fasteners including a suction cup for affixing a portion of the dash cover to the inner surface of a vehicle's windshield.

The dash cover 100 includes a series of grommets 122, 124 provided at corner regions of the pliable panel 102 to accommodate attaching fasteners including suction cups 126, 128 employed for attaching or securing a portion of the pliable panel 102 to a hard surface such as the inner surface of a vehicle's windshield, as better illustrated in FIG. 2. Each suction cup 126, 128 is affixed to respective grommets 122, 124 using any suitable fastener such as a screw, bolt and nut, with an adhesive, or glue, or using a plastic welding technique. In one embodiment, each grommet 110, 112, 122, 124 comprises a % inch sized grommet though other sizes may be implemented.

Figure 3:
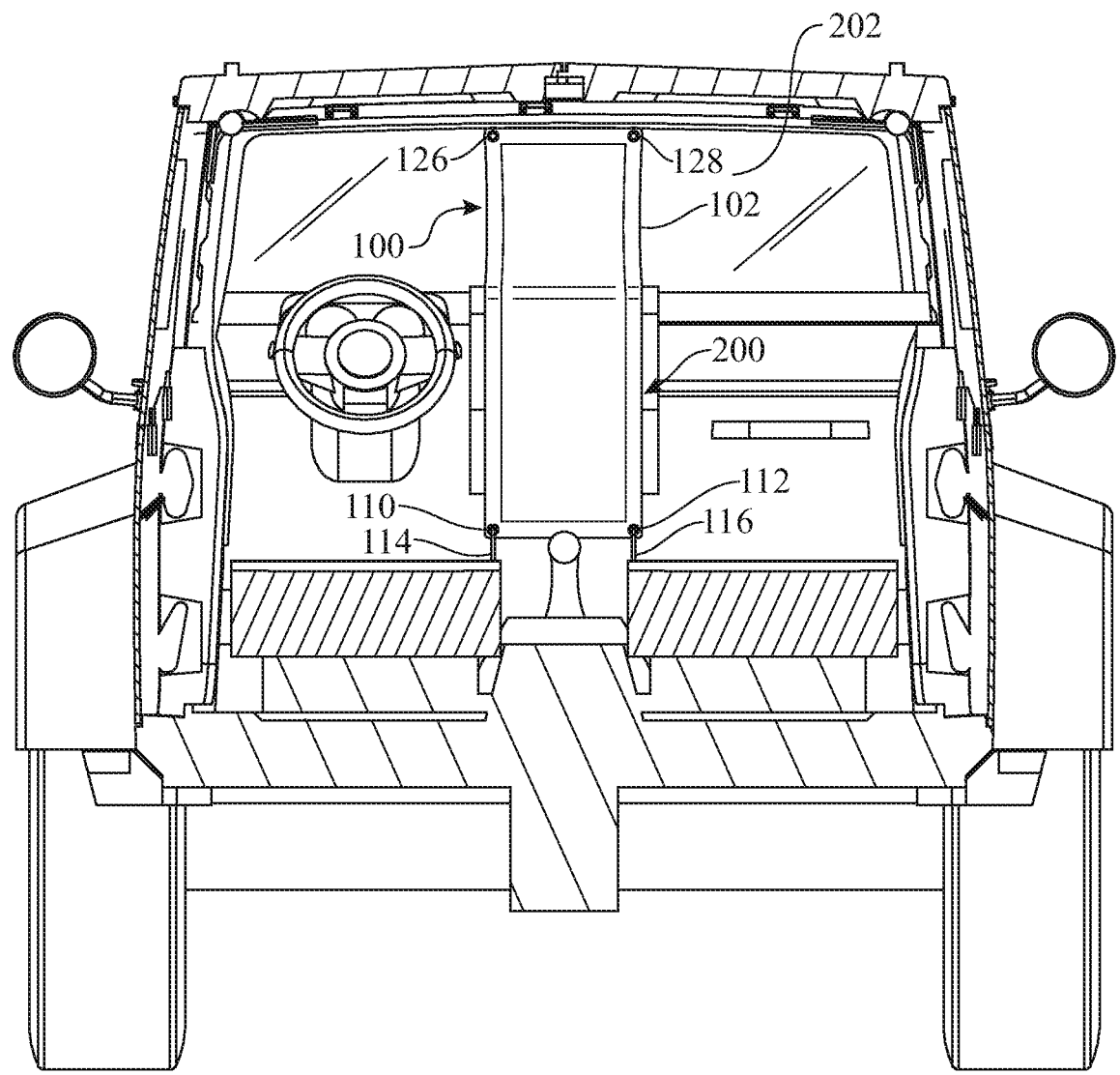
FIG. 3 presents an open, rear view of a vehicle, showing the dash cover of FIG. 1 secured in place with suction cups affixed to vehicle's windshield and cords coupled to front seats or vehicle console for covering the vehicle's electronic radio from rain or debris.

With reference now made to FIG. 3, the dash cover 100 is installed within the vehicle to cover electronics 200 such as the radio components provided on the dashboard of a vehicle. The vehicle may include a Jeep Wrangler often used to travel over wide-open spaces and rough terrains. The doors and/or windows are often removed from the vehicle during use. Water, mud and other debris often infiltrate the interior of the Jeep when traveling over muddy or wet terrain, or when during periods when it is raining. Occupants can quickly and easily protect the electronics 200 from possible damage due to exposure to rain and debris by simply covering the equipment with the dash cover 100. In doing so, the pliable panel 102 is aligned directly over the electronics 200, and suction cups 126, 128 are affixed to the inner surface of the vehicle's windshield 202. The pair of S-hooks 118, 120, provided at the ends of cords 114, 116, are secured to metal bars or parts located at the bottom section of the driver and passenger seats, or to a designate area of the vehicle console. The suction cups 1126, 128 can be affixed anywhere on the inner surface of the vehicle's windshield 202. As such, suction cups 126, 128 may be attached along the top, middle, or lower region of the windshield 202 to properly align the pliable panel 102 and cover the electronics 200. The water resistant characteristics of the pliable panel 102 will repel any water and moisture from possibly damaging the electronics 200.

Figure 4:
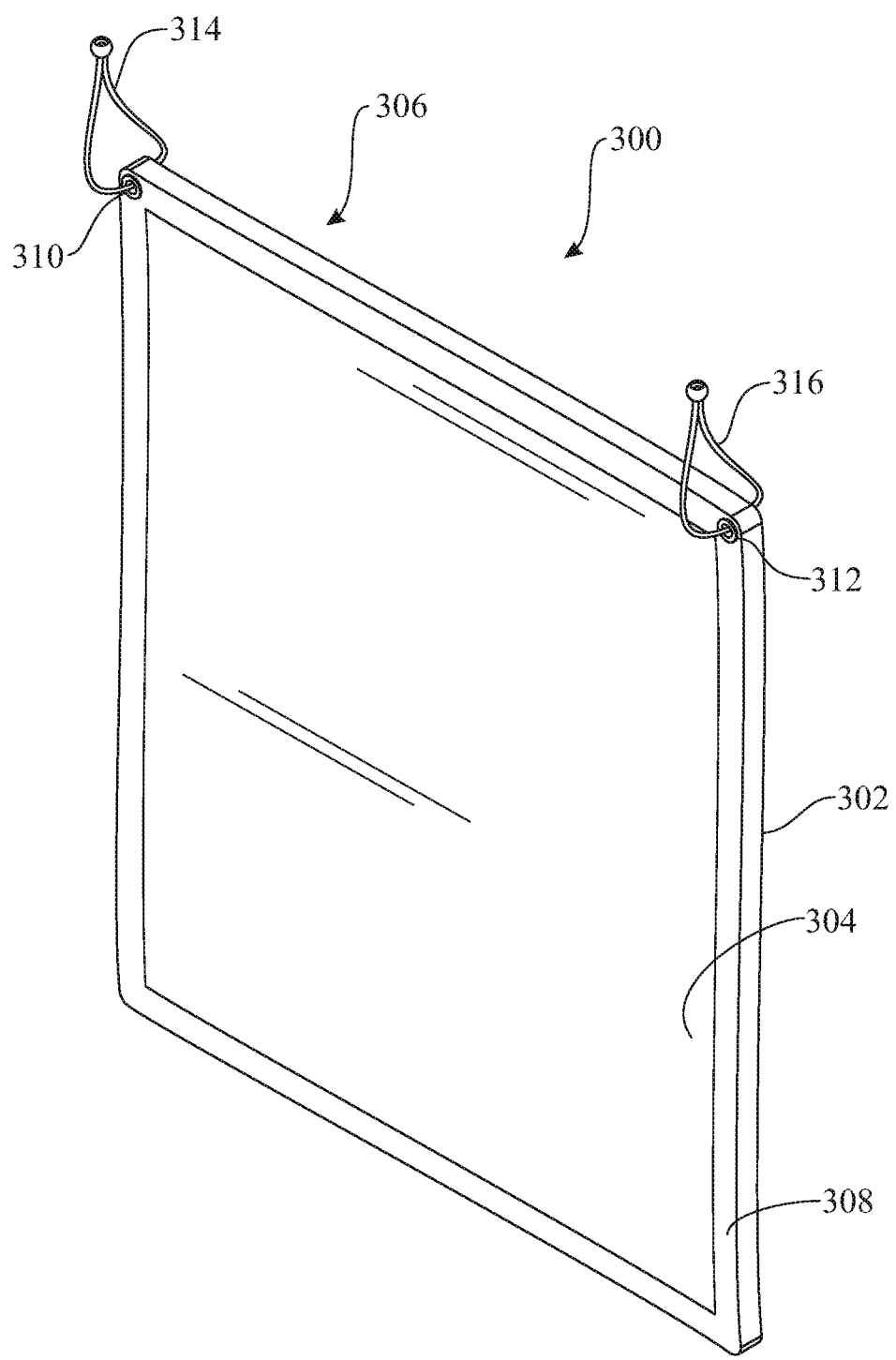
FIG. 4 presents a front, perspective view of a cover assembly including a privacy curtain for covering one or more door and/or window openings to provide privacy to occupants of the vehicle, showing a pliable panel including grommets and multiple fasteners for securing the privacy curtain in place in the vehicle, in accordance with another embodiment of the present invention.

Turning now to FIG. 4 there is shown a front, perspective view of a cover assembly including a privacy curtain 300 for providing privacy to occupants of a vehicle in certain situations such as when sleeping in the vehicle, or when changing clothes. In such situations, occupants may wish to prevent possible on-lookers, who may be wandering around the vehicle, from peering into the interior. One embodiment of the privacy cover 300 includes a generally square or rectangular pliable panel 302 having a front 304, a back 306, and an integral or one or more seams 308 surrounding the peripheral edge of the pliable panel 302. Similar to pliable panel 102, pliable panel 302 may be constructed from a durable water resistant, polyester, rip stop fabric. The dimensional configuration of the pliable panel 302 is selected to adequately cover one or more door and/or window openings to prevent on-lookers from peering inside the vehicle. In one non-limiting embodiment, exemplary dimensions of the pliable panel 302 may comprise 20 inches in height, and 22 inches in length.

The privacy curtain 300 includes one or more grommets 310, 312 provided at corner regions of the pliable panel 302 for accommodating long or short cords 314, 316 that are used for attaching one end of the pliable panel 302 to one or more roll bars provided in a vehicle, such as a Jeep Wrangler. Each long or short cord 314, 316 may include nylon or cotton cords having a fixed length, an adjustable length, or alternatively, each long or short ball cord 314, 316 may comprise a long or short ball bungee cord. The ball provided at the ends of each long or short cord 314, 316 prevent the ends of the cords 314, 316 from fraying over time.

Figure 5:
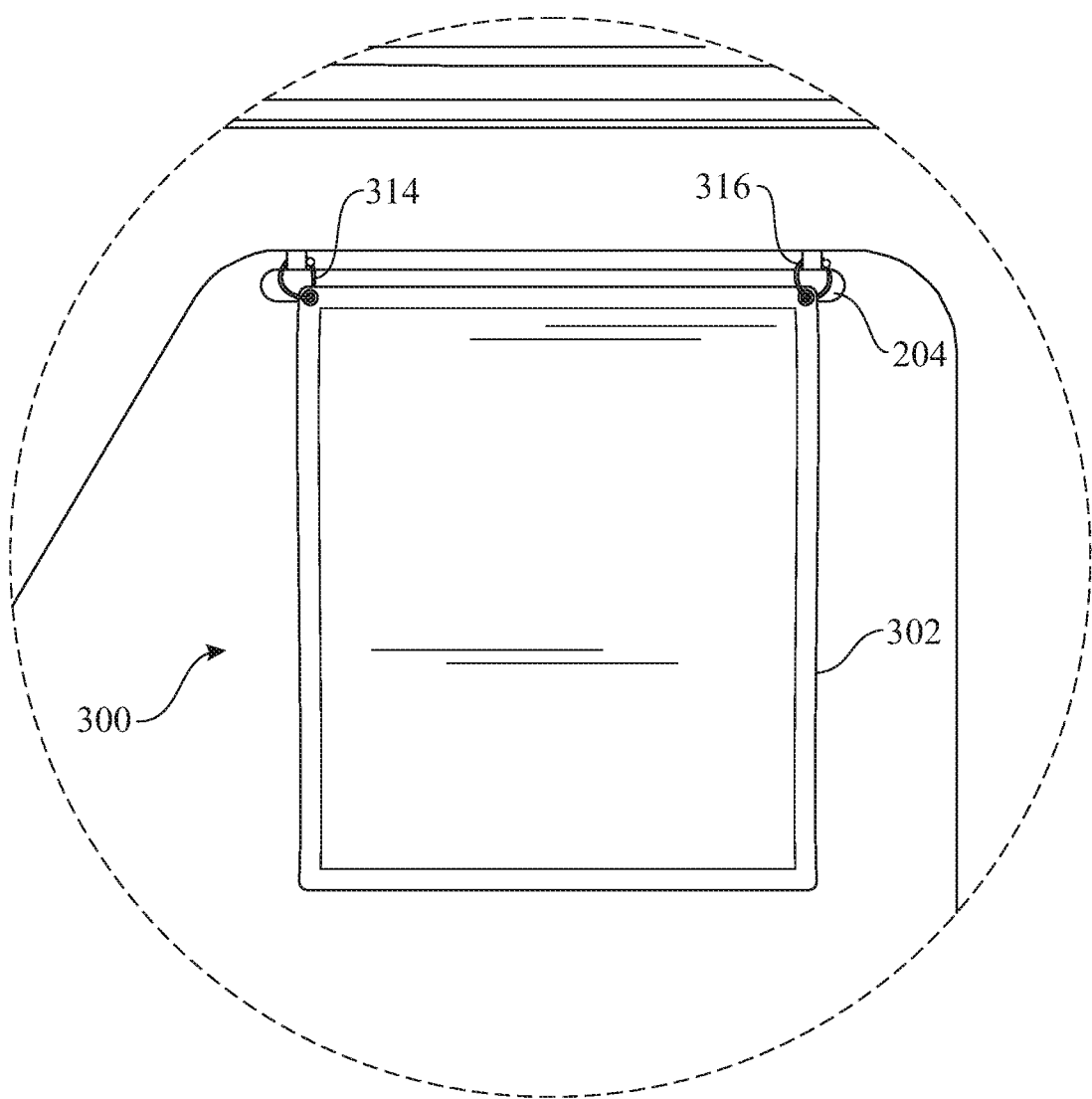
FIG. 5 presents an inner, side view of the vehicle, showing the privacy curtain of FIG. 4 attached to a roll bar extending above a door and/or window opening of the vehicle.

As shown in FIG. 5, privacy cover 300 is securely attached to a roll bar denoted at 204. Each respective cord 314, 316 is looped around the distal ends of the roll bar 204 to secure the pliable panel 302 in place over side front or back window openings. The dimensional size of the privacy cover 300 may be increased to cover back window openings of the vehicle as well. Although not shown, additional grommets may be provided at the lower portion of the pliable panel 302 to secure the lower portion of the pliable panel 302 to a bracket, rail, or other part of a driver's or passengers seat thus displacing the pliable panel 302 in a stretched out configuration.

Figure 6:
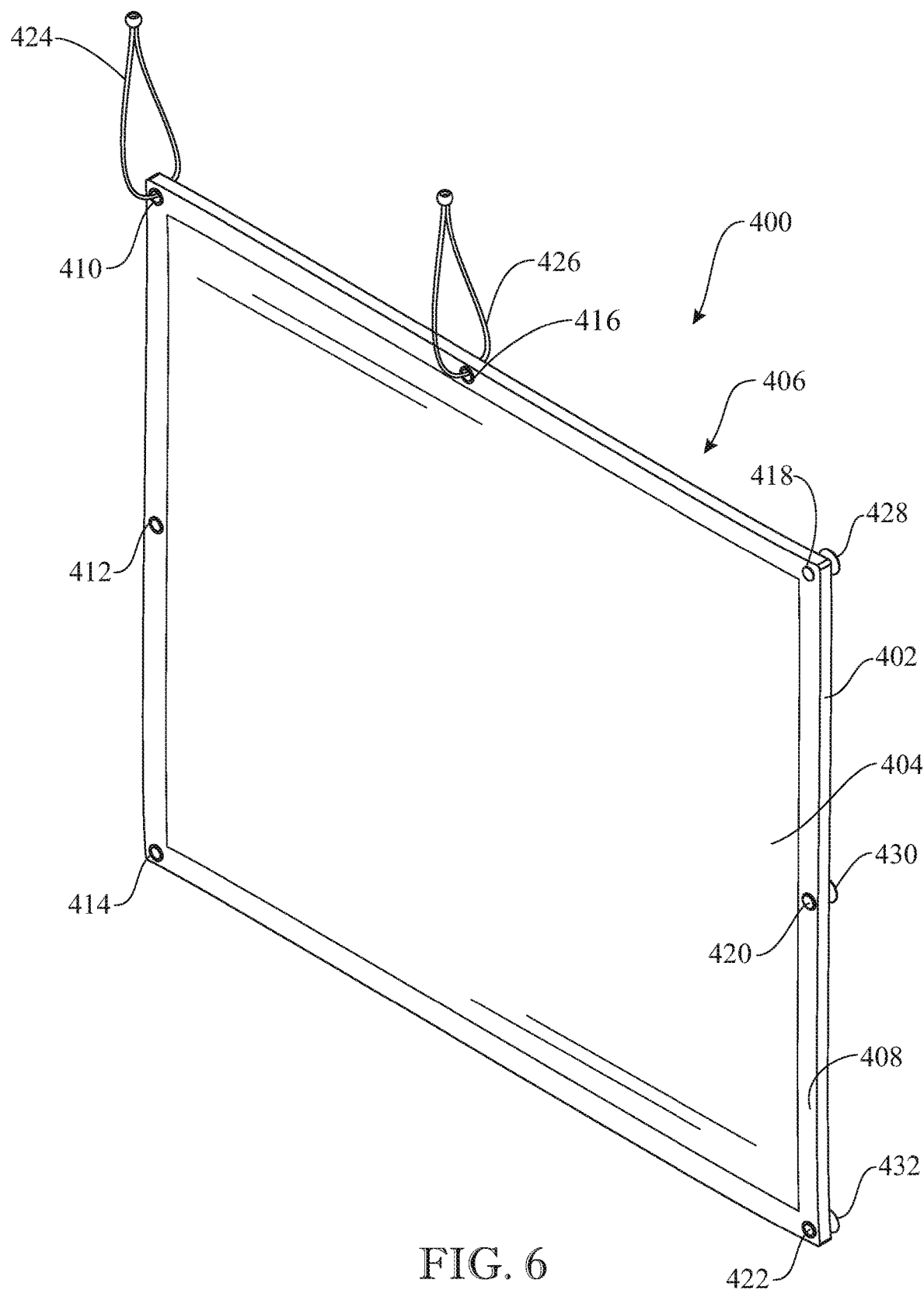
FIG. 6 presents a front, perspective view of a cover assembly including a rain curtain for use with a vehicle having two doors, showing a pliable panel including grommets and multiple fasteners for securing the rain curtain over one or more door and/or window openings, in accordance with another embodiment of the present invention.

With reference now made to FIG. 6, there is shown a front, perspective view of a cover assembly including a rain curtain 400 employed for shielding the interior of a vehicle having two doors, in accordance with another embodiment of the present invention. The rain curtain 400 is constructed from a generally square or rectangular pliable panel 402 having a front 404, a back 406, and one or more integral seams 408 surrounding the peripheral edge of the pliable panel 402. In one embodiment, the pliable panel 402 is constructed from a durable water resistant or repellant, polyester, rip stop fabric, or other material such as plastic or polymer. The dimensional configuration of pliable panel 402 is selected to cover the door and/or window openings of the 2-door vehicle to prevent rain and other debris from entering the interior of the vehicle. The rain curtain 400 may be designed for use with a particular vehicle model such as a Jeep Wrangler having two doors. As such, in one non-limiting embodiment, exemplary dimensions of the pliable panel 402 includes 42 inches in height, and 48 inches in length, to properly cover both the side front and back window openings of both the driver's and passenger's sides.

Rain curtain 400 includes a plurality of grommets 410, 412, 414, 416, 418, 420, 422 provided at designated areas along the peripheral seam 408 of the pliable panel 402 for accommodating multiple fasteners. The multiple fasteners include long and/or short ball bungee cord 424, and a long or short bungee central cord 426 for attaching the rain curtain 400 to one or more roll bars extending above the window openings of the vehicle. In one embodiment, a long ball bungee cord 424 is looped around grommet 410 provided at a one corner of the pliable panel 402, and short ball bungee cord 426 is looped around grommet 416 provided at the central region of the pliable panel 402, as illustrated in FIG. 6. Additional fasteners such as suction cups 428, 430, 432 are provided to attach a portion of the pliable panel 402 to a hard surface such as the inner or outer surface of a vehicle's window. It is appreciated that rain curtain 400 may include any number of grommets and fasteners for properly attaching the curtain 400 and covering the front and back window openings of a vehicle.

When covering side front and/or back window openings, the rain curtain 400 is oriented over the door and/or window openings, and short ball bungee cord 426 is secured to a roll bar 204. During the installation process, the suction cup 428 is subsequently removably attached to the outer surface of the vehicle's windshield. Another suction cup 432, provided at the lower corner region of the pliable panel 402, may be attached to the outer surface of the vehicle's body. The longer ball bungee cord 424, as shown in FIG. 6, is secured around a sound bar provided at the back region of the vehicle.

Figure 8:
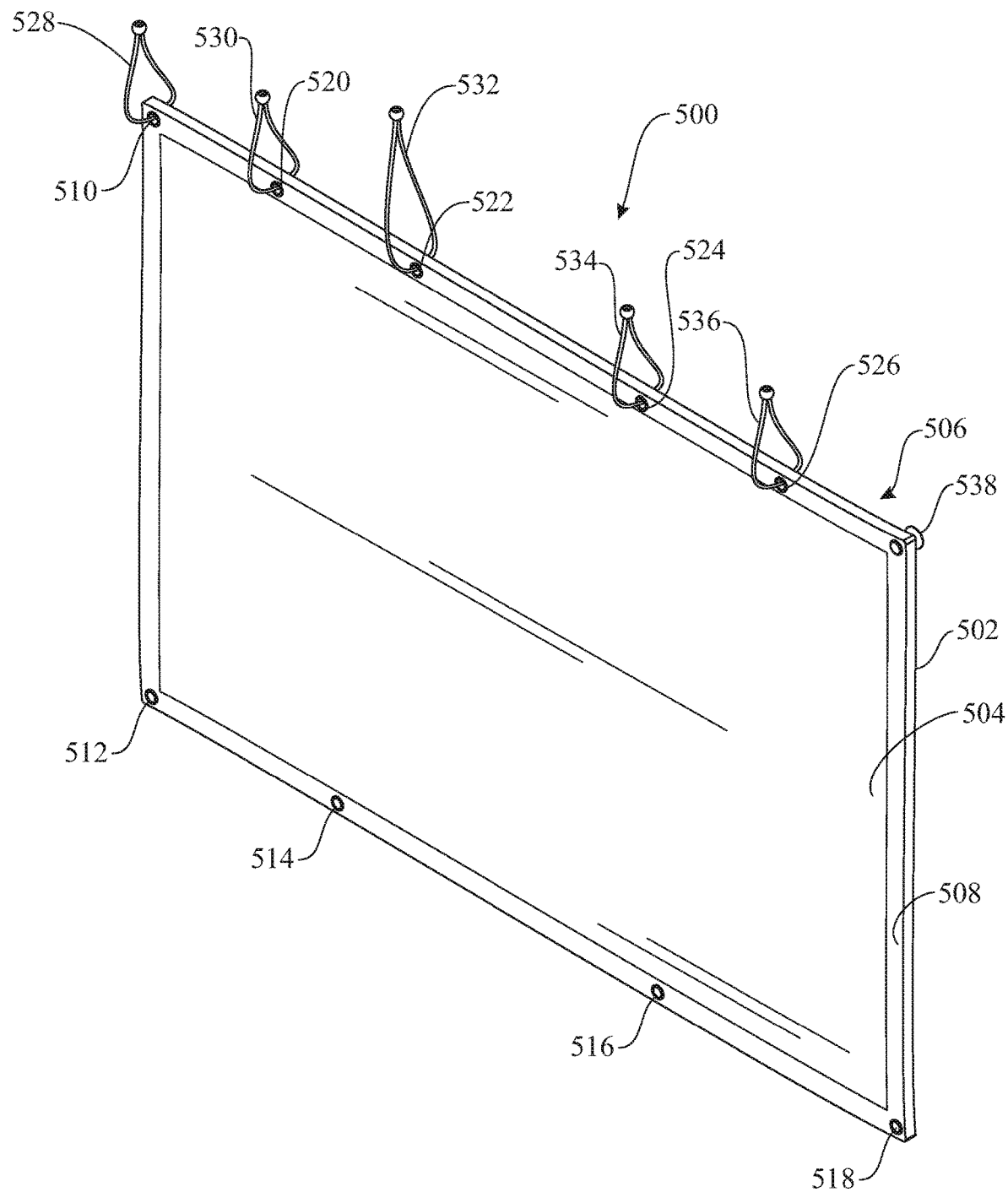
FIG. 8 presents a front, perspective view of a cover assembly including a rain curtain for use with a vehicle having four doors, showing a pliable panel including grommets and multiple fasteners for securing the rain curtain over one or more door and/or window openings, in accordance with another embodiment of the present invention.

With reference now made to FIG. 8, there is presented a front, perspective view of a cover assembly including a rain curtain 500 for shielding the interior of a vehicle having four doors, in accordance with another embodiment of the present invention. Some vehicles such as the Jeep Wrangler for example, includes two doors, or alternatively four doors. Rain curtains are provided to accommodate use with either vehicle model. As such, rain curtain 500 is particularly designed for use with vehicles such as the Jeep Wrangler having four removable doors and/or windows. Rain curtain 500 includes a pliable panel 502 having a front 504, a back 506, and an integral 1-inch seam 508 surrounding the peripheral edge of the pliable panel 502. The rain curtain 500 is dimensionally sized to cover the side door and/or window openings, and the back window openings as well. In one non-limiting embodiment, the rain curtain 500 is 48 inches in height, and 75 inches in length. The pliable panel 502 includes a plurality of grommets 510, 512, 514, 516, 518, 522, 524, 526 for accommodating fasteners including long or short cords, and suction cups. A series of grommets are provided at the top lateral edge of the pliable panel 502, along seam 508, beginning with grommet 510. Grommets 520 and 526 are displaced 13 inches from respective opposite ends of pliable panel 502, grommet 522 is situated 27½ inches from one end of the pliable panel 502, and grommet 524 is situated 31 inches from another end of the pliable panel 502. Additional grommets include 512, grommet 514 which is situated 18¼ inch from one longitudinal edge of the pliable panel 502, and grommet 516 which is situated 23½ inches from another longitudinal edge of pliable panel 502. Short ball bungee cords 528, 530, 534, and 536 are looped around respective grommets 510, 520, 524, and 526, and long ball bungee cord 532 is looped around grommet 522. Additional fasteners including suction cups 538 and 518 are affixed to the pliable panel 502 for securing the rain curtain 500 in place over selected window openings.

Figure 7:
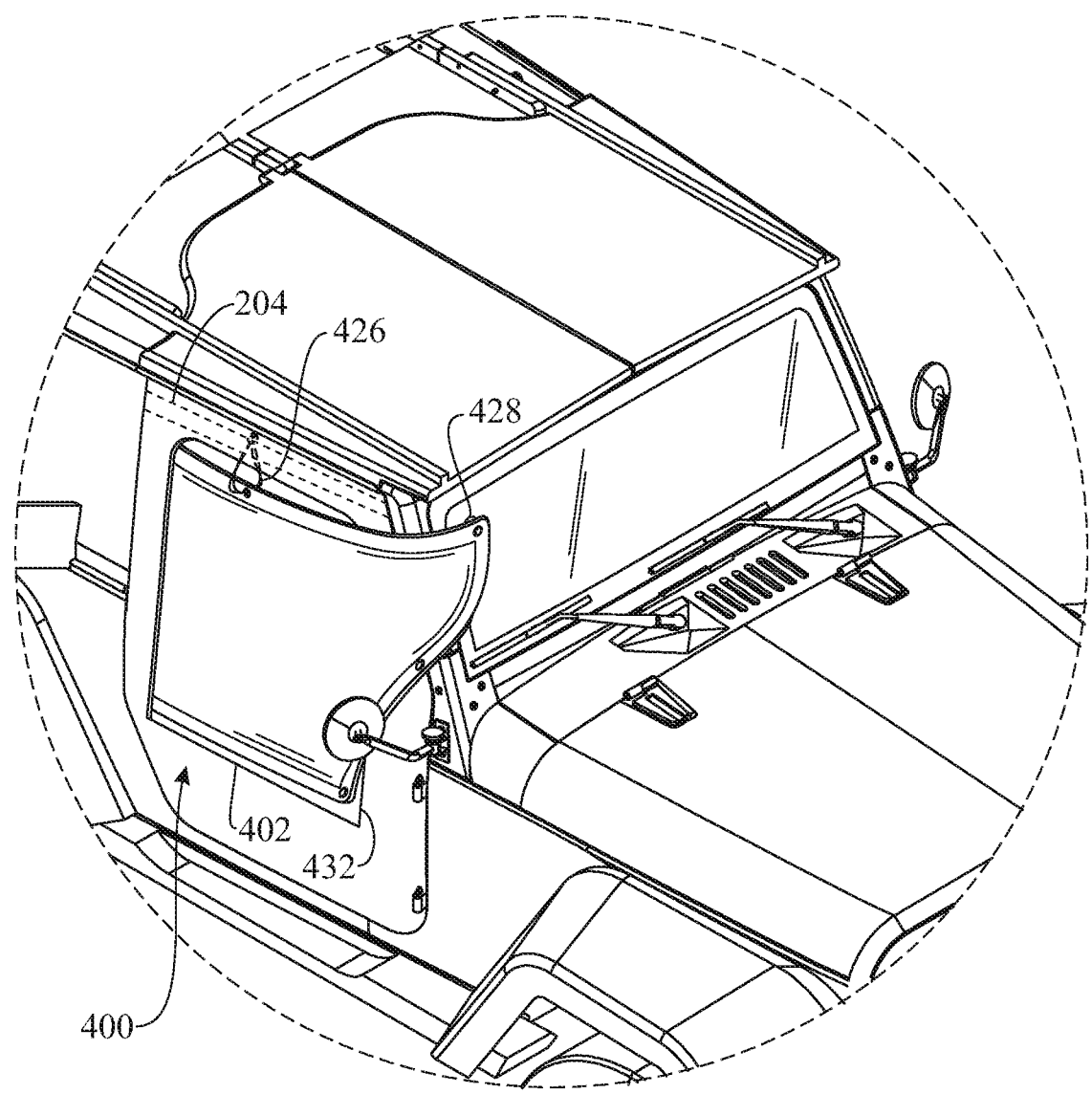
FIG. 7 presents a partial, top, side perspective view of the vehicle with two doors, showing the rain curtain of FIG. 6 secured over a window opening and attached to the vehicle's roll bar and windshield.

When installing rain curtain 500 on a vehicle such as a Jeep Wrangler having four doors, individuals orient the pliable panel 502 over any door and/or window opening. The short ball bungee cords 528, 530, 532, 534, 536 are secured to roll bars and/or sound bar of the vehicle, and the suction cups 538, 518 are affixed to both the outer surface of the windshield, and optionally to the hard body surface of the vehicle, as illustrated in FIG. 7. The installed rain curtain 500 prevents rain, mud, and other debris from entering the interior of the vehicle when riding in rough, open terrain, or on muddy trails.

The cover assembly provides a variety of different privacy curtains that are designed to protect the privacy of occupants from possible on-lookers. As described earlier, a privacy curtain 300 is provided to cover individual door and/or window in circumstances when occupants wish to sleep in the vehicle such as when camping, want to change their clothes in private, or simply want to attain privacy for any other reason.

Figure 9:
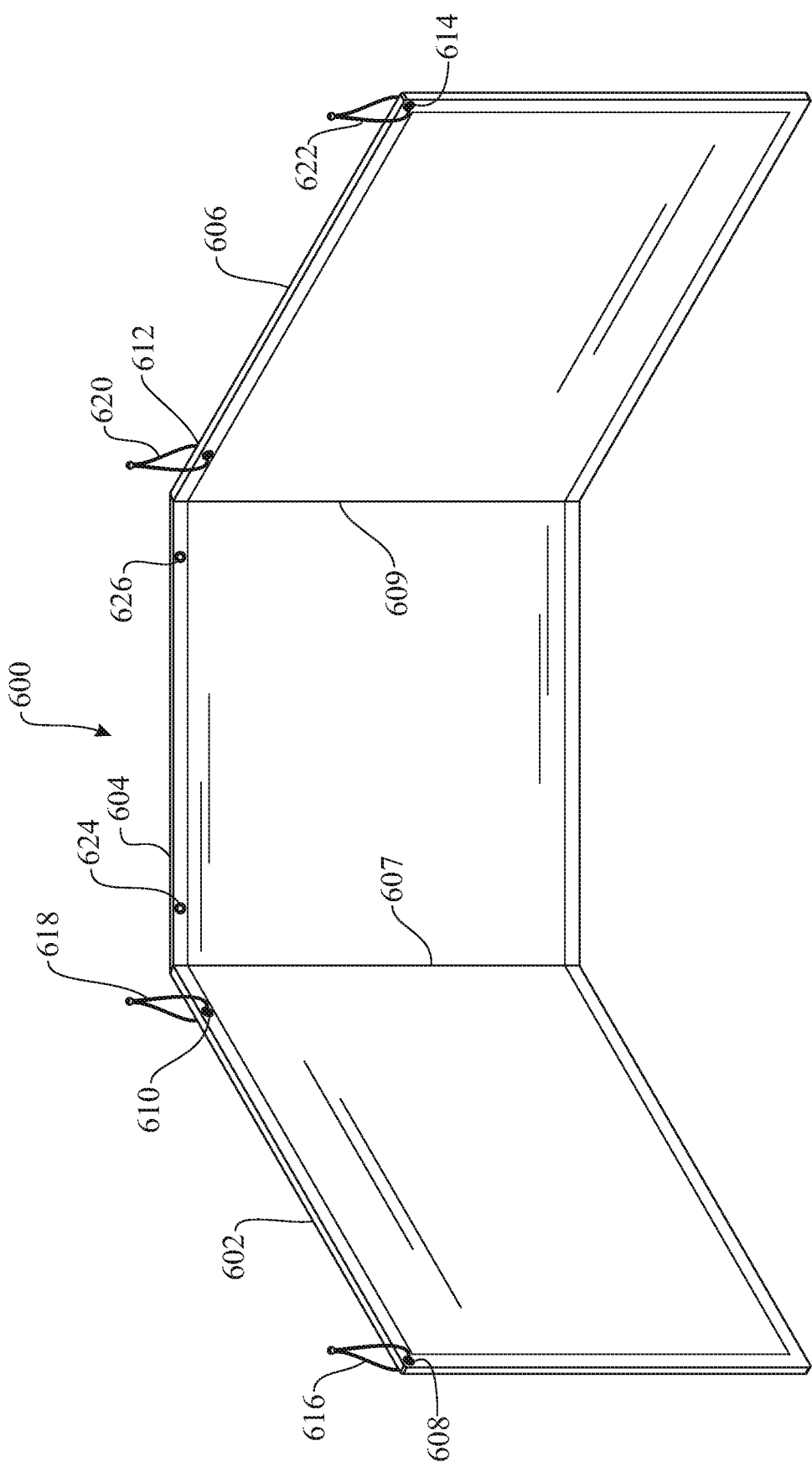
FIG. 9 presents a front view of cover assembly including a full front privacy curtain, showing a series of pliable panels joined together, and including grommets and multiple fasteners for securing the full front privacy curtain within the front region of the vehicle to cover one or more door and/or window openings, and the windshield, in accordance with another embodiment of the present invention.

Additional privacy curtains are made available to cover side front door and/or window openings, back window openings, and a front windshield of a vehicle if desired. As provided in one alternative embodiment, a cover assembly also includes a full front privacy curtain 600, as illustrated in FIG. 9. The full front privacy curtain 600 includes a series of pliable panels 602, 604, 606 each similar in construction to pliable panels 300, 400 and 500. In one embodiment, the pliable panels 602, 604 and 606 are joined together along longitudinal seams 607, 609 to provide an integral privacy curtain. Pliable panels 602, 606 each include a pair of grommets 608, 610, and 612, 614, respectively, to accommodate long or short ball bungee cords 616, 618, 620, and 622. A middle pliable panel 604 includes a pair of suction cups 624, 626 provided along the top lateral edge.

Figure 10:
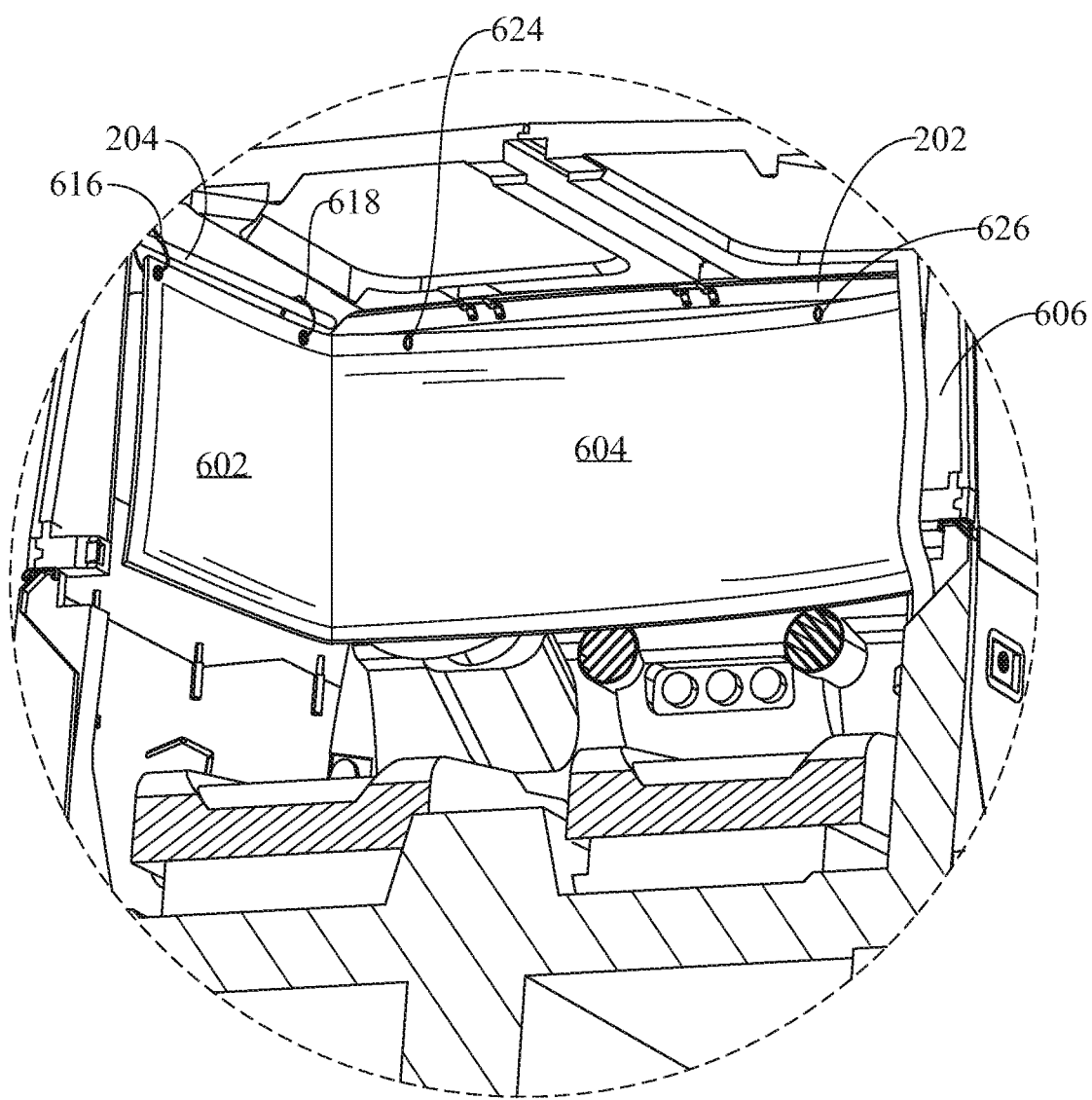
FIG. 10 presents a partial, interior view of a vehicle, showing the full front privacy curtain of FIG. 9 secured to roll bars extending above one or more door and/or window openings, and to the windshield of a vehicle to provide privacy to occupants of the vehicle.

To attain privacy, occupants of a vehicle can easily and quickly mount the full privacy curtain in place to cover the side front and back window openings, and the vehicle's windshield as illustrated in FIG. 10. The long or short ball bungee cords 616, 618 of pliable panel 602 are secured to a first roll bar 204, and long or short ball bungee cords 620, 622 are secured to another roll bar provided on opposite sides of roll bar 204. Suction cups 624, 626 are affixed to the inner surface of the vehicle's windshield 202. When installed, the pliable panels 602, 606 cover side front and/or back window openings of the vehicle, and pliable panel 604 covers the vehicle's windshield thereby providing privacy, and isolating occupants from onlookers who may be peering into the interior of the vehicle.

It is appreciated that other privacy curtains having different dimensions can be provided to accommodate covering a rear or back window of a vehicle such as a Jeep Wrangler. For example, a rear window privacy curtain including a pliable panel similar in construction to pliable panel 300 may be constructed to include a dimensional size of 20 inches in height, and 27 inches in length, and include a pair of grommets that are provided at top corner regions to accommodate long and/or short ball bungee cords where the cords are used to secure the rear window privacy curtain over a rear window of a vehicle. In another embodiment, a back window privacy curtain including a pliable panel similar in construction to pliable panel 300 may also be constructed to include a dimensional size of 20⅝ inches in height, having a top region that is 46⅝ inches in length integral with a bottom region that is 49 inches in length, where the pliable panel includes suction cups similar to suction cups 428 of pliable panel 400, and/or long or short bungee cords for attaching the back window privacy curtain to a back window of a vehicle.

It is also appreciated that the dash cover 100, privacy curtains 300, 600, and rain curtains 400, 500 may include any number of long or short cords including for example long or short ball bungee cords, and/or suction cups for properly attaching and securing the cover 100, and curtains 300, 400, 500, 600 to a vehicle for covering door and/or window openings, and the windshield and back window. The pliable panels 102, 302, 402, 502, 602, 604, 606 may include any color, design, pattern, picture, symbol, character, number, or other indicia. For example, each pliable panel 102, 302, 402, 502, 602, 604, 606 may include a camouflage design, the same or different color and pattern, or comprise a transparent, translucent, or opaque material. In addition, instructive indicia such as arrows or directive instructions may be printed on any surface of the pliable panels 102, 302, 402, 502, 602, 604, 606 to illustrate or properly instruct users regarding the orientation, layout, installation process, or use. Further, the dash cover 100, privacy curtains 300, 600, and rain curtains 400, 500 may be machine-washable, and/or treated with heat-resistant, mildew-resistant, or ultraviolet resistant agents or chemicals. Representative examples of various dimensions have been described, however, it will be noted that the dash cover 100, privacy curtains 300, 600, and rain curtains 400, 500 may comprise any dimensional size selected to functionally cover door and/or window openings, or windshield or back windows of various vehicles. A storage bag or designated storage receptacle may be provided to store and transport the dash cover 100, privacy curtains 300, 600, and rain curtains 400, 500.

The cover assembly includes a dash cover 100, privacy curtains 300, 600, and rain curtains 400, 500 that include long or short ball bungee cords, and/or suction cups for properly attaching and securing at least a dash cover 100, and any of curtains 300, 400, 500, 600 together within a vehicle, as one assembly, for covering door and/or window openings, and/or a windshield or back window of a vehicle having roll bars. The privacy curtains 300, 600, and or rain curtains 400, 500 can also be employed for covering a portion of the top of a vehicle such as the freedom panel portion of the top. Also, panel 602 may also be used to cover a portion of the vehicle's dash as well. The ability to use the rain curtains 400, 500 and/or privacy curtains 300, 600 for alternative applications provides added benefit of applicability.

It is contemplated that another type of cover can be constructed to drape over the steering wheel of a vehicle to protect the clockspring of the vehicle. For example, a clock spring cover may be constructed similar to that of dash cover 100 but comprise larger dimensions. The clock spring cover includes a panel including a pair of suction cups, and long and/or short ball bungee cords with or without hooks. In use, the suction cups are attached to the windshield and the panel is draped over the steering wheel where the long and/or short ball bungee cords are secured in place to retain the clock spring cover over the steering wheel of the vehicle.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A cover assembly it removably attachable to a vehicle, the cover assembly kit comprising;
    a dash cover including a first pliable panel having a first pair and a second pair of attachments, the dash cover attachable to the vehicle for covering electronics provided in the vehicle such that the first pair of attachments are removably attached to an inner surface of a windshield associated with the vehicle and the second pair of attachments are coupled to front seats of the vehicle;
    at least one privacy curtain including a second pliable panel having a third and a fourth attachment, the at least one privacy curtain attachable to the vehicle for covering at least one opening associated with either a window or door, or a window and door, of the vehicle such that the third and the fourth attachments are secured to an interior portion of the vehicle;
    at least one rain curtain including a third pliable panel having a fifth and a sixth attachment, the at least one rain curtain attachable to the vehicle for covering the at least one opening such that the fifth attachment is secured to the interior portion of the vehicle, and the sixth attachment is releasably affixed to an outer portion of the vehicle,
        wherein the fifth attachment of the at least one rain curtain is secured to a roll bar of the vehicle, and the sixth attachment of the at least one rain curtain is secured to the outer portion of a windshield; and
        wherein either the at least one privacy curtain and the at least one rain curtain, or the dash cover and any one of the rain curtain or the privacy curtain are attached to the vehicle to provide a protective assembly for covering either the at least one opening, or the at least one opening and the electronics.

2. The cover assembly of claim 1, wherein the first pair of attachments each include a suction cup and the second pair of attachments each include a hook.

3. The cover assembly of claim 1, wherein the attachments include one or more long or short ball bungee cords.

4. The cover assembly of claim 2, wherein the hook provided is an S-hook.

5. The cover assembly of claim 1, wherein the at least one privacy curtain includes a first privacy curtain including a pliable panel, a second privacy curtain including a pliable panel, and a third privacy curtain including a privacy panel.

6. The cover assembly of claim 5, wherein the first, the second, and the third privacy curtain are in material-continuation, and include folding lines at each foldable connection joint.

7. The cover assembly of claim 5, wherein the pliable panel of the first curtain has a dimensional size of 20 inches in height, and 22 inches in length, the pliable panel of the second curtain has a dimensional size of 20 inches in height, and 27 inches in length, and the pliable panel of the third curtain has a dimensional size of 20 inches in height, a top region of 46 inches in length with a bottom region being 49 inches in length.

8. The cover assembly of claim 1, wherein the at least one rain curtain is for use with a vehicle having two doors where each door is removable, or includes a window that is removable.

9. The cover assembly of claim 1, wherein the at least one rain curtain is for use with a vehicle having four doors where each door is removable or includes an associated window that is removable.

10. The cover assembly of claim 1, wherein the third and the fourth attachments of the at least one privacy curtain are secured to a roll bar of the vehicle.

11. The cover assembly of claim 1, wherein the pliable panel of the rain curtain has a dimensional size of 42 inches in height, and 48 inches in length.

12. The cover assembly of claim 11, wherein the third and fourth attachment of the pliable panel includes one or more long and or short bungee cords, and at least one suction cup.

13. The cover assembly of claim 1, wherein the pliable panel of the rain curtain has a dimensional size of 48 inches in height and 75 inches in length.

14. The cover assembly of claim 13, wherein the third and fourth attachment of the pliable panel includes one or more long and or short bungee cords, and at least one suction cup.

15. The cover assembly of claim 1, wherein each pliable panel includes a front, a back, a seam that surrounds the outer peripheral edge of the pliable panel, and at least two grommets.

16. The cover assembly of claim 15, wherein each pliable panel includes a design made out of either transparent, translucent, or opaque material.

17. The cover assembly of claim 1, wherein each pliable panel comprises a machine washable and or heat-treated with water resistant, mildew resistant, or ultraviolet resistant material.

18. A cover assembly kit removably attachable within a vehicle, said cover assembly kit comprising;
    a dash cover including a first pliable panel having a first and a second attachment each including an S-hook, and a first pair of suction cups, the dash cover attachable to the vehicle for covering electronics provided in the vehicle such that the first pair of suction cups are removably attached to an inner surface of a windshield associated with the vehicle and the S-hooks are coupled to front seats;
    at least one privacy curtain including a full front privacy curtain having a plurality of pliable panels including at least a third and a fourth attachment, the at least one privacy curtain attachable to the vehicle for covering at least one opening associated with either a window or door, or a window and door, of the vehicle such that the third and the fourth attachment are secured to roll bars extending above the at least one opening, wherein a first pliable panel of the plurality of pliable panels of the at least one privacy curtain includes one or more long and/or short ball bungee cords, and a second pliable panel of the plurality of pliable panels of the at least one privacy curtain includes a second pair of suction cups, and a third pliable panel of the plurality of pliable panels of the at least one privacy curtain includes one or more long and/or short ball bungee cords, where the first pliable panel, second pliable panel, and third pliable panel are attached together along longitudinal seams forming one integral front privacy curtain;

at least one rain curtain including a third pliable panel having a fifth and a sixth attachment, and a third pair of suction cups, the at least one rain curtain attachable to the vehicle for covering the at least one opening such that the fifth and sixth attachment are secured to the roll bars, and at least one suction cup of the third pair of suction cups is releasably affixed to an outer surface of the windshield; and wherein either said at least one privacy curtain and said at least one rain curtain, or said dash cover and any of said curtains are attached to said vehicle to provide a protective assembly for covering either said at least one opening, or said at least one opening and said electronics, and wherein each pliable panel comprises a machine washable and or heat-treated with water resistant, mildew resistant, or ultraviolet resistant material.

19. A cover assembly kit removably attachable within a vehicle, said cover assembly kit comprising;

a dash cover including a first pliable panel having a first and a second attachment each including an S-hook, and a first pair of suction cups, the dash cover attachable to the vehicle for covering electronics provided in the vehicle such that the first pair of suction cups are removably attached to an inner surface of a windshield associated with the vehicle and the S-hooks are coupled to front seats;

at least one privacy curtain including a full front privacy curtain having a plurality of pliable panels including at least a third and a fourth attachment, the at least one privacy curtain attachable to the vehicle for covering at least one opening associated with either a window or door, or a window and door, of the vehicle such that the third and the fourth attachment are secured to roll bars extending above the at least one opening, wherein a first pliable panel of the plurality of pliable panels of the at least one privacy curtain includes one or more long and/or short ball bungee cords, and a second pliable panel of the plurality of pliable panels of the at least one privacy curtain includes a second pair of suction cups, and a third pliable panel of the plurality of pliable panels of the at least one privacy curtain includes one or more long and/or short ball bungee cords, where the first pliable panel, second pliable panel, and third pliable panel are attached together along longitudinal seams forming one integral front privacy curtain, and wherein the first pliable panel has a dimensional size of 20 inches in height, and 22 inches in length, the second pliable panel has a dimensional size of 20 inches in height, and 27 inches in length, and the third pliable panel o has a dimensional size of 20 inches in height, a top region of 46 inches in length with a bottom region being 49 inches in length;

at least one rain curtain including a third pliable panel having a fifth and a sixth attachment, and a third pair of suction cups, the at least one rain curtain attachable to the vehicle for covering the at least one opening such that the fifth and sixth attachment are secured to the roll bars, and at least one suction cup of the third pair of suction cups is releasably affixed to an outer surface of the windshield; and wherein the rain curtain is provided in either a first or a second configuration, the first configuration of the rain curtain having a dimensional size of 42 inches in height, and 48 inches in length, and the second configuration of the rain curtain having a dimensional size of 48 inches in height and 75 inches in length wherein either said at least one privacy curtain and said at least one rain curtain, or said dash cover and any of said curtains are attached to said vehicle to provide a protective assembly for covering either said at least one opening, or said at least one opening and said electronics, and wherein each pliable panel comprises a machine washable and or heat-treated with water resistant, mildew resistant, or ultraviolet resistant material.

* * * * *